US011716155B2

(12) United States Patent
Szelest et al.

(10) Patent No.: US 11,716,155 B2
(45) Date of Patent: Aug. 1, 2023

(54) METHOD FOR TESTING IN-VEHICLE RADIO BROADCAST RECEIVER DEVICE

(71) Applicant: Aptiv Technologies Limited, St. Michael (BB)

(72) Inventors: Marcin Szelest, Cracow (PL); Pawel Skruch, Mogilany (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/659,296

(22) Filed: Apr. 14, 2022

(65) Prior Publication Data

US 2022/0345233 A1 Oct. 27, 2022

(30) Foreign Application Priority Data

Apr. 26, 2021 (EP) ..................................... 21170541

(51) Int. Cl.
*H04B 17/00* (2015.01)
*H04B 17/26* (2015.01)
(Continued)

(52) U.S. Cl.
CPC ........... *H04B 17/26* (2015.01); *H04B 1/1646* (2013.01); *H04H 40/36* (2013.01)

(58) Field of Classification Search
CPC ........ H04B 17/10; H04B 17/18; H04B 17/20; H04B 17/26; H04B 1/1646; H04B 1/1669;
(Continued)

(56) References Cited

U.S. PATENT DOCUMENTS 5,092,343 A 3/1992 Spitzer et al.
10,832,672 B2* 11/2020 Gordon .................... G06F 3/167
(Continued)

FOREIGN PATENT DOCUMENTS

CN 111044621 4/2020
DE 102008062734 6/2010
(Continued)

OTHER PUBLICATIONS

"Extended European Search Report", EP Application No. 21170541.3, dated Oct. 28, 2021, 8 pages.

*Primary Examiner* — Tuan Pham
(74) *Attorney, Agent, or Firm* — Colby Nipper PLLC (57) ABSTRACT

The method includes splitting a radio signal received at an in-vehicle antenna into two RF streams, and at the device under test, converting the first RF stream into a demodulated audio signal and transmitting it to the tester and recorder device. The tester and recorder device also receives the demodulated audio signal, determines a spectrum of frequencies over time, inputs the spectrum of frequencies into an artificial intelligence (AI) module of audio abnormality detection. The device also receives the second RF stream, converts it into a data signal, and records the data signal into a temporary storage memory. Then, when the AI module outputs of a positive detection of audio abnormality, the device transfers data from the temporary storage memory into a permanent storage memory, where the transferred data corresponds to a time window including the detected audio abnormality.

20 Claims, 2 Drawing Sheets

(51) Int. Cl.
*H04B 1/16* (2006.01)
*H04H 40/36* (2008.01)

(58) Field of Classification Search
CPC .................. H04B 1/207; H04B 2001/3811; H04H 20/88; H04H 40/72; H04H 60/70; H04H 60/58
See application file for complete search history.

(56) References Cited

U.S. PATENT DOCUMENTS

| | | |
|---|---|---|
| 11,330,384 B2* | 5/2022 | Lee .................. G10L 25/51 |
| 2010/0145615 A1 | 6/2010 | Mccrank et al. |
| 2011/0222705 A1 | 9/2011 | Blaszczynski et al. |
| 2019/0385057 A1 | 12/2019 | Litichever et al. |
| 2021/0407493 A1* | 12/2021 | Ramakrishnan ........ G10L 25/51 |

FOREIGN PATENT DOCUMENTS

| | | |
|---|---|---|
| FR | 3087599 | 4/2020 |
| KR | 100503215 | 10/2004 |

* cited by examiner

FIG. 1

METHOD FOR TESTING IN-VEHICLE RADIO BROADCAST RECEIVER DEVICE

CROSS-REFERENCE TO RELATED APPLICATION

This application claims priority to European Patent Application Number 21170541.3, filed Apr. 26, 2021, the disclosure of which is hereby incorporated by reference in its entirety.

BACKGROUND

Today, modern vehicles are equipped with an in-vehicle infotainment system including hardware components and software components that provide audio and/or video entertainment. One part of the in-vehicle infotainment system is a radio broadcast receiver device. It can receive different types of radio transmissions such as analog signals, for example FM or AM signals, and digital transmissions, for example DAB (Digital Audio Broadcasting), DAB+, etc.

In an illustrative example, an in-vehicle radio broadcast receiver device is tuned to receive a broadcasting source via a DAB transmission and, at some point, the vehicle is leaving the DAB range, which causes the radio receiver device to automatically switch from DAB to FM in order to receive the same broadcasting source via a FM transmission. In the vehicle, the switching from DAB to FM should not be recognized by the driver who is listening the audio signal output by a loudspeaker. More generally, the driver should not recognize that the radio receiver device changes the source of the received radio signal. The switching should be transparent for the driver. However, in practice, such a switching is likely to produce a sound error (also called a chirp) that results in an unpleasant sound effect for the driver. The audio phenomenon is undesirable and may be dangerous if the driver is disturbed by the sound effect. Other circumstances may cause audio abnormalities, or sound errors, for example an interference phenomenon or a damage to the audio signal.

The in-vehicle radio broadcast receivers are designed not to produce audio abnormalities (in other words: unwanted unpleasant sound effects). The audio abnormalities can be reduced, and/or suppressed, and/or avoided. For example, the radio broadcast receiver can include a chirp-blanking system. Ideally, the radio broadcast receiver should not produce any audio abnormality.

To build a radio broadcast receiver, a manufacturer needs to test it in a vehicle, in real conditions. The undesirable phenomenon of producing an audio abnormality (unwanted sound effect) is random and very difficult to reproduce experimentally. It is needed to perform a series of troublesome in-vehicle tests consisting in sending on road a vehicle equipped with a radio broadcast receiver under test and driven by a driver, to drive many kilometers so as to catch moments when unpleasant sound effects can be heard by the driver. Such a testing operation has many disadvantages. A first disadvantage is that it is time and resource consuming as the driver needs to spend long periods of time driving the vehicle to often get a small number of detections of audio abnormalities. A second disadvantage is that the detection of an audio abnormality is made "by ear", which is not totally reliable. A third disadvantage is that, when a firmware of the radio broadcast receiver is changed or updated, the testing operation must be performed again.

Therefore, there is a need for facilitating the testing operations and reducing the human resources necessary to perform the testing operations.

SUMMARY

The present disclosure concerns a method for testing a radio broadcast receiver device in a vehicle and recording data related to an abnormal audio behavior of the radio broadcast receiver device under test, the method including the steps of: receiving, by a receiver antenna, a radio signal carrying an audio information from a radio broadcasting source; by a splitter, splitting the received radio signal into a first radio signal stream and a second radio signal stream, and transmitting the first radio signal stream to the radio broadcast receiver device under test and the second radio signal stream to a tester and recorder device; and at the radio broadcast receiver device under test, converting the first radio signal stream into a demodulated audio signal and transmitting the demodulated audio signal to the tester and recorder device. The method further includes, at the tester and recorder device: by a control part, receiving via a first input the demodulated audio signal, determining from a spectrum of frequencies over time of said demodulated audio signal, inputting the determined spectrum of frequencies into an AI (Artificial Intelligence) module of audio abnormality detection; by a radio receiver part, receiving via a second input the second radio signal stream, converting said second radio signal stream into a data signal and recording said data signal into a temporary storage memory; and, when the AI module outputs of a positive detection of audio abnormality, controlling, by the control part, a transfer of data from the temporary storage memory into a permanent storage memory, the transferred data corresponding to a time window including the detected audio abnormality.

The present method can be used in the field (in other words: when the vehicle is driving on roads and can receive one or more radio broadcasting stations) or on a test bench (in other words: in laboratory conditions, two or more radio broadcasting sources operating on the bench) and allows to automatically detect an abnormal behavior of the device under test, by an AI module such as a neural network fed in input with the spectrum of frequencies, as it varies with time, of the demodulated audio signal outputted by the device under test, and to save the data carried by the RF signal that caused the detected event. The saved data can be used to reproduce the detected event at a later time without need of reusing the vehicle, for example for a regression testing operation.

The method can further include a step of false positive detection, carried out by the control part of the tester and recorder device, including receiving an additional information related to the received radio signal obtained from a source external to the broadcast radio receiver device under test and verifying that the positive detection from the AI module is not a false positive detection based on said additional information. In implementations, the controlling a transfer of data from the temporary storage memory into a permanent storage memory is performed only in case of a non-false positive detection of an audio abnormality.

The false positive detection allows to identify the situations when the AI module outputs a positive detection of an abnormal audio behavior of the device under test (true flag at the output of the AI module) that actually corresponds to a normal behavior because the strange sound effect detected by the AI module was caused by something else, like an user action, for example an increase of the audio volume or a switch of the radio broadcasting source. When such a situation is detected (in other words: when a false positive detection is identified), the data is not transferred from the temporary memory to the permanent memory, which allows to avoid saving permanently data that is not useful to reproduce later an interesting situation in a testing operation.

In an embodiment, the method further includes the steps of, by the control part of the tester and recorder device, obtaining messages from an on-board communication network of the vehicle, and determining that the positive detection of audio abnormality is a false positive detection based on the obtained messages.

The messages from the on-board communication network of the vehicle can be recorded in the temporary storage memory and, in case of detection of an audio abnormality, that is not a false positive detection, the messages corresponding to said time window including the detected audio abnormality are transferred from the temporary storage memory to the permanent storage memory.

In an embodiment, the method further includes the steps of: by the radio receiver part of the tester and recorder device, inputting the second radio signal stream into a reference broadcast radio receiver that converts said second radio signal stream into a reference demodulated audio signal and transmits said reference demodulated audio signal to the control part; and by the control part of the tester and recorder device, determining from the reference demodulated audio signal a spectrum of frequencies over time, and inputting the spectrum of frequencies of the reference demodulated audio signal into the AI module.

In an embodiment, the method includes a step of converting, by the radio receiver part of the tester and recorder device, the second radio signal stream into a baseband data signal that is recorded into the temporary storage memory.

It is better to save the baseband signal that needs less memory space. To replay (or reproduce) later an event that has been recorded in the permanent memory, the recorded baseband signal can be taken and moved to the original frequency spectrum so as to reconstruct a signal that is almost the same as the original signal that was converted to the baseband and recorded.

In an embodiment, the method further includes the step of: at the radio receiver part of the tester and recorder device, applying the second radio signal stream to a first software defined radio receiver and to a second software defined radio receiver. In implementations the first software defined radio receiver is tuned to receive said radio broadcasting source using a first frequency and a first modulation, and the second software defined radio receiver is tuned to receive said radio broadcasting source using at least one of a second frequency, different from the first frequency, and a second modulation, different from the first modulation.

A radio broadcast source may broadcast programs via different transmission methods, using different RF signal sources. For example, it can broadcast a same program via FM (Frequency Modulation) transmission, and DAB ((Digital Audio Broadcasting) or DAB+ transmission. The tester and recorded device has two (or more) software defined radio receivers to receive and process concomitantly RF signals broadcast via the different transmission modes. In case of a switch from one signal source to another signal source, this allows to record all the signals from the two signal sources.

Advantageously, when the second radio signal stream is applied to the first software defined radio receiver and to the second software defined radio receiver, the first software defined radio receiver outputs a first baseband data signal, the second software defined radio receiver outputs a second baseband data signal, the first baseband data signal and the second baseband data signal are recorded in the temporary storage memory, and, in the step of transferring data, the first baseband data signal and the second baseband data signal are transferred from the temporary storage memory into the permanent storage memory.

The method can further include a step of generating testing scenarios from the data stored in the permanent storage memory and storing the testing scenarios in a database for a later use in another testing operation.

The method can also include a step of using said testing scenarios in an operation of regression testing of said radio broadcast receiver device under test or in an operation of testing another radio broadcast receiver device.

The present disclosure also concerns a tester and recorder device for testing a radio broadcast receiver device in a vehicle, while a radio signal carrying an audio information is being received from a radio broadcasting source by a receiver antenna in the vehicle, and recording data related to an abnormal behavior of the radio broadcast receiver device under test, including a first input for receiving a demodulated audio signal from the radio broadcast receiver device under test, said demodulated audio signal corresponding to a first radio signal stream split from the received radio signal; a control part that receives the demodulated audio signal; a second input for receiving a second radio signal stream split from the received radio signal; a radio receiver part that received the second radio signal stream; a temporary storage memory; and a permanent storage memory. In implementations, the control part and the radio receiver part perform the corresponding steps of the method previously defined.

In an embodiment, the radio receiver part receives, via the second input, the second radio signal stream from the antenna, converts the second radio signal stream into a data signal and records said data signal into the temporary storage memory. The control part receives, via the first input, the demodulated audio signal, determines from said demodulated audio signal a spectrum of frequencies over time, inputs the determined spectrum of frequencies into an AI (Artificial Intelligence) module of audio abnormality detection and, when the AI module outputs of a positive detection of audio abnormality, controls a transfer of data from the temporary storage memory into the permanent storage memory, the transferred data corresponding to a time window including the detected audio abnormality.

In an embodiment, the control part further includes a false-positive detector that receives messages from an on-board communication network of the vehicle, and determines that the positive detection of audio abnormality is a false positive detection based on the obtained messages. The controlling, by the control part, a transfer of data from the temporary storage memory into a permanent storage memory is performed only in case of a non-false positive detection of an audio abnormality.

Advantageously, the radio receiver part converts the second radio signal stream into a baseband data signal before recording into the temporary storage memory.

In an embodiment, the radio receiver part includes: a first software defined radio receiver tuned to receive said radio broadcasting source RBS using a first frequency and a first modulation; and a second software defined radio receiver tuned to receive said radio broadcasting source RBS using at least one of a second frequency, different from the first frequency, and a second modulation, different from the first modulation, wherein the second radio signal stream is applied to the first software defined radio receiver and to the second software defined radio receiver.

The present disclosure also concerns a system including the tester and recorder device as previously defined and a splitter for splitting the radio signal received at the receiver antenna.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
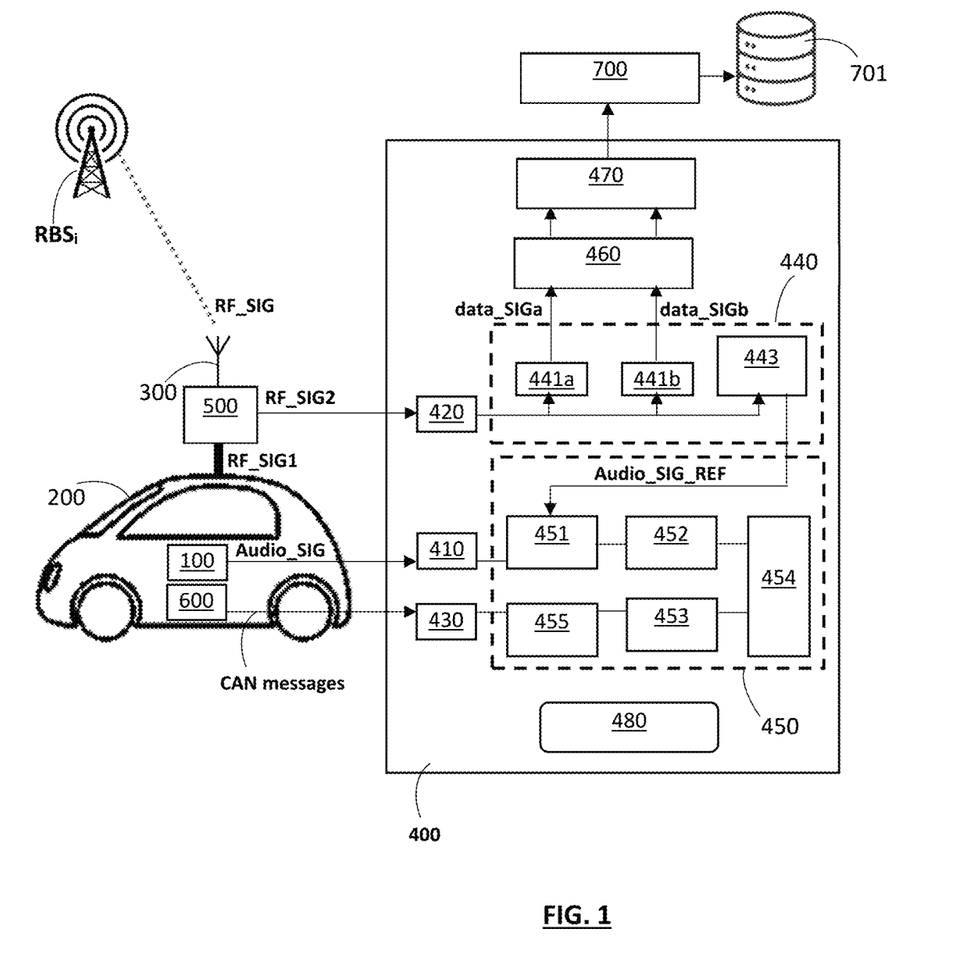
FIG. 1 illustrates a system for testing a radio broadcast receiver device in a vehicle and recording data related to an abnormal behavior, according to an embodiment.

The testing and recording system represented in FIG. 1 can be used to test a radio broadcast receiver device 100 either in the field or on a test bench.

For a testing and recording operation in the field, the radio broadcast receiver device 100 is installed in a vehicle 200, typically when the vehicle 200 is moving and a radio signal (or RF signal) carrying an audio information is being received from a radio broadcasting source $RBS_i$, such as a radio station, by a receiver antenna 300 in the vehicle 200, and to record data related to an abnormal audio behavior of the radio broadcast receiver device under test 100. The radio broadcast receiver device under test 100 can receive radio signal (in other words: RF signals) from a plurality of radio broadcasting sources $RBS_i$ with i=1, 2, . . . . An abnormal audio behavior of the radio broadcast receiver device under test 100 corresponds to an unwanted sound effect (in other words: a noise nuisance, also called a chirp) produced at its output, by a loudspeaker or more generally by an electro-acoustic transducer. The data recorded by the testing and recording system can then be used to generate testing scenarios, by a scenario generator 700, each scenario reproducing a situation in relation to an abnormal audio behavior (previously detected) of the radio broadcast receiver under test 100. The testing scenarios can be stored in a scenario database 701. They can be used and replayed later in a regression testing operation of the radio broadcast receiver device 100, for example after a change of a software in the device under test 100, and in a testing operation of another radio broadcast receiver device.

The testing and recording system has two main components: a tester and recorder device 400 and a splitter 500 for splitting the radio signal received at the receiver antenna 300.

The receiver antenna 300 is connected to the radio broadcast receiver device under test 100 and the tester and recorder device 400, via the splitter device 500. In an embodiment, the splitter 500 is a passive device such as a directional coupler. Alternatively, it can be any other type of RF signal splitter. The splitter 500 is in charge of: splitting the radio signal RF_SIG received at the receiver antenna 300 into a first radio signal stream RF_SIG1 and a second radio signal stream RF_SIG2; and transmitting the first radio signal stream RF_SIG1 to the radio broadcast receiver under test 100 and the second radio signal stream RF_SIG2 to the tester and recorder device 400.

The tester and recorder device 400 is responsible for testing the radio broadcast receiver device 100 in the vehicle 200, while a radio signal RF_SIG carrying an audio information is being received from a radio broadcasting source $RBS_i$ by the receiver antenna 300 in the vehicle 200, detecting any abnormal behavior of the radio broadcast receiver device under test 100 causing an unwanted sound effect and for recording data related to the abnormal behavior detected.

The tester and recorder device 400 has: a first input 410 for receiving a demodulated audio signal Audio_SIG, that is an analog audio signal, from the radio broadcast receiver device under test 100, corresponding to the first radio signal stream RF_SIG1 split from the received radio signal RF_SIG by the splitter 500; and a second input 420 for receiving the second radio signal stream RF_SIG2 from the splitter 500.

The demodulated audio signal Audio_SIG, at the output of the radio broadcast receiver device 100, is an analog audio signal suitable to be transmitted to an electro-acoustic transducer device like a loudspeaker device. It can include two audio signal parts for left and right outputs on the transducer device.

Optionally, the tester and recorder device 400 has a third input 430 and a message acquirer and interpreter 455 for receiving messages from an on-board (in-vehicle) communication network of the vehicle 200. In an embodiment, the messages are CAN messages from an automotive CAN (Controller Area Network) bus through which in-vehicle microcontrollers and devices communicate with each other. A message transmitter 600 in the vehicle 200 is responsible for filtering all infotainment related HMI messages (for example, volume level, radio button click, etc.) and odometry data (GPS, speed, yaw rate, etc.) exchanged via the communication network (CAN bus) in the vehicle and transmitting the filtered messages and data to the tester and recorder device 400. The message transmitter 600 can include a software component running on a processor 480 of the tester and recorder device 400.

The CAN messages received by the tester and recorder device 400 include, if available, information related to (the list below is an illustrative and non-limitative example): user commands entered by a user via a HMI (Human-to-Machine Interface) in the vehicle 200, in particular user commands for controlling the radio broadcast receiver device under test 100 (for example for increasing the audio volume on a loudspeaker output or for switching the radio broadcasting source and/or the audio source), a position information of the vehicle 200, including for example GPS position coordinates of the vehicle 200, a moving information of the vehicle 200 including velocity and optionally acceleration, heading, and/or expected trajectory for at least x seconds in the future; or information related to the radio signal RF_SIG received by the receiver antenna 300, including for example a strength, a frequency and/or a modulation of the received radio signal RF_SIG.

The tester and recorder device 400 has a radio receiver part 440, a control part 450, a temporary storage memory 460 and a permanent storage memory 470.

In an embodiment, the radio receiver part 440 includes a first software defined radio component 441a, a second software defined radio component 441b, a reference radio broadcast receiver device 443, different from the radio broadcast receiver device under test 100. The radio receiver part 440 is connected to the second input 420. The first software defined radio component 441a, the second software defined radio component 441b and the reference radio broadcast receiver device 443 receive the first radio signal stream RF-SIG1 via the second input 420.

The tester and recorder device 400 has at least two software defined radio receivers 441a, 441b due to the fact that the radio broadcasting sources may propagate their programs via two or more modes of transmission, such as FM, DAB, etc. When the radio broadcast receiver device 100 receives signals from a given radio broadcasting source $RBS_i$, via the antenna 300, an RF signal having a given frequency (for example: a frequency within the FM band 87.5-108 MHz in case of a FM transmission), termed as a first frequency $f_1$, and a given modulation (for example: frequency modulation), termed as a first modulation $mod_1$, the first software defined radio receiver 441a and the second defined radio receiver 441b are programmed to be automatically tuned as follows: the first software defined radio receiver 441a is tuned to receive said radio broadcasting source $RBS_i$ using the first frequency $f_1$ and the first modulation $mod_1$; and the second defined radio receiver 441b is tuned to receive the same radio broadcasting source $RBS_i$ but using at least one of a second frequency $f_2$, different from the first frequency $f_1$, (for example: a frequency within the DAB band 174-240 MHz) and a second modulation mode, different from the first modulation $mod_1$ (for example: OFDM, or a PSK modulation).

The frequency $f_1$ and modulation $mod_1$ of the second radio signal stream received via the second input 420 is determined automatically by the software defined radio receivers.

For example, the first software defined radio receiver 441a is tuned to receive a given radio broadcasting source $RBS_i$ via a FM transmission, and the second software defined radio receiver 441b is tuned to receive the same radio broadcasting source $RBS_i$ via a DAB (or DAB+) transmission.

The reference radio broadcast receiver device 443 is different from the radio broadcast receiver device under test 100. For example, the two devices are produced by two different manufacturers or are different products of the same manufacturer. In operation, the second radio signal steam RF_SIG2 is applied to the reference radio broadcast receiver device 443, in input.

In other embodiments, the radio receiver part 440 has more than two software defined radio receivers. One of them is automatically tuned to receive the radio broadcasting source $RBS_i$ using the first frequency $f_1$ and the first modulation mode (i.e., the same frequency and modulation as the ones set in the radio broadcast receiver under test 100) and each of the other software defined radio receivers are tuned to receive the same radio broadcasting source $RBS_i$ but using a different frequency and/or a different modulation from the frequency and modulation set in the radio broadcast receiver under test 100.

The software defined radio receivers 441a, 441b are responsible for converting the second radio signal stream RF_SIG2 into a data signal to be recorded into the temporary storage memory 460. In an embodiment, the radio signal stream RF_SIG2 is converted by each radio defined software receiver 441a, 441b into a baseband data signal. The software defined radio receivers 441a, 441b are tuned to take one or more parts of the frequency spectrum of the received radio signal RF_SIG2 and move them to the base band frequency. Each radio defined receiver 441a, 441b translates the input signal from an original frequency to the baseband frequency.

The data streams at the outputs of the radio defined software receivers 441a, 441b are continuously saved into the temporary storage memory 460. The temporary storage memory 460 is for example a buffer, like a cyclic buffer, having a given storage capacity. For example, it can record the equivalent of a time window of at least 40 seconds of the received radio signal RF, as the recorded data may cover a minimum of 20 seconds before and after an event such as an audio abnormality. In this way, it is possible to reproduce a detected event at a later time in laboratory conditions. The saving of the baseband signals does not need much space in memory.

The control part 450 is connected to the first input 410 and the third input 430 and receives: via the first input 410, the demodulated audio signal Audio_SIG from the radio broadcast receiver device under test 100, corresponding to the first radio signal stream RF_SIG1; and via the third input, CAN messages from the vehicle 200.

The control part 450 has a signal analyzer 451, an AI (Artificial Intelligence) module of audio abnormality detection 452, a CAN message acquirer and interpreter 455, a false-positive detector 453, a generator 454 for generating a control signal for transferring data from the first temporary memory 460 to the second permanent memory 470.

A central unit 480, or processor, is also provided and controls the operation of the tester and recorder device 400. In an embodiment, the signal analyzer 451, the AI module 452, the false-positive detector 453, the CAN message acquirer and interpreter 455 and the generator 454 are software components that run on the processor 480.

The signal analyzer 451 is responsible for determining a spectrum of frequencies over time (i.e., as the frequency varies with time) of the demodulated audio signal Audio_SIG. It can use the Fast Fourier Transform. The AI (Artificial Intelligence) module of audio abnormality detection 452 is for example a machine learning module, such as a neural network, trained to detect an unwanted sound effect in the analog audio signal AUDIO_SIG.

The neural network 452 is responsible for detecting an abnormal behavior of the radio broadcast receiver device 100 resulting in an unwanted sound effect on a loudspeaker output. In an embodiment, the detection is carried out based on the spectrum of frequencies over time of the audio demodulated signal (analog) at the output of the radio broadcast receiver device 100.

A training operation of the neural network 452, according to an embodiment, will now be described. During the training, the neural network 452 is fed with training data including the spectrums of frequencies over time of audio samples as input data, and either a true flag (positive detection of an audio abnormality) or a false flag (no detection of audio abnormality), as output data.

During a first stage of the training operation, the audio samples used as training data are of different types. For example, they include music, advertisements, and speeches. The input training data is preferably perfect data that is not distorted (in other words: without chirp, without noise, and without some strange signals). Many different styles of music are used for the training. The different types of input training data (music, advertisement, and speech), that are fed to the neural network 452 during the first stage of the training, should not generate an alert at the output of the neural network 452. In other words, during the first stage of the training, the neural network 452 may output a false flag (no distortion), meaning that everything is fine, and not output any positive detection of an unwanted sound effect corresponding to an abnormal audio behavior of the device under test.

At a second stage of the training operation, distorted (in other words: corrupted) data is used for the training. The distorted data also includes samples of music, advertisement, and speech. But, in that case, the training data includes audio abnormalities or distortions, like chirps or any other unwanted sound effects. The distorted data can be recorded data (for example, data recorded during an operation of collecting data with a testing vehicle having a broadcast radio receiver), or generated data by creation of distortions (for example by cutting the data randomly and switching the order of the cut pieces of data, and/or by adding some signals into the data to create a distortion, and/or by modifying the strength of the audio signal by programming, etc.) The distorted data (more precisely, the spectrums of frequency of the distorted data) is expected to generate an alert (in other words: a true flag), corresponding to a positive detection of an audio abnormality (unwanted sound effect) at the output of the neural network 452. In the training, the true flag is set as the output of the neural network 452 only in the time when the audio distortion occurs.

The process of labelling the training data is manual. In other words, the training uses human labelled data. For example, a log of x minutes of distorted data (for example, 60 minutes) is output by a loudspeaker and a human, for example with a mouse, places marks on the data where a problem (distortion) can be heard. In other words, the human listens x minutes of distorted data log and indicates time points or periods of time when the flag is true (in other words: when an audio problem can be heard). The distorted data is manually labelled or "ground-truthed". In this way, the neural network 452 is trained to detect the distortions that are unpleasant to hear. The function of the neural network 452 is to detect a "problem" and a problem means something unpleasant to hear.

The false positive detector 453 is responsible for detecting that a positive detection of the neural network 452 is actually a false positive detection. In operation, the false positive detector 453 receives additional information related to the received radio signal RF_SIG from an information source that is external to the broadcast radio receiver device under test 100 and, in case of a true flag at the output of the neural network 452, verifies that it is not a false positive detection based on the additional information.

In an embodiment, the additional information includes at least one of two following elements of information: information from CAN messages from the vehicle 200, received via the third input 430; or the spectrum of frequencies over time of the demodulated audio signal at the output of the reference radio broadcast receiver device 443.

As will be explained later in the description of the method, the false positive detector 453 uses the CAN messages from the vehicle 200 and the demodulated audio signal at the output of the reference radio broadcast receiver device 443 to determine if a positive detection (true flag) at the output of the neural network 452 is a false positive detection or not. In an embodiment, the output of the detector 453 is a signal indicating when a false positive detection has been identified (detected).

In an embodiment, the generator 454 receives in input the output of the neural network 452 and the output of the false positive detector 453. It generates a control signal for transferring data from the temporary memory 460 to the permanent memory 470, only when a true flag is received from the neural network 452 and the signal at the output of the detector 453 does not indicate a false-positive detection.

The false-positive detector 453 has been described as a component distinct from the AI module 452. However, the function of false-positive detection can be integrated into the AI module 452. In that case, in addition to the spectrum of frequencies over time of the demodulated audio signal at the output of the radio broadcast receiver under test 100, the AI module 452 receives as inputs the CAN messages from the vehicle 200 and the spectrum of frequencies over time of the demodulated audio signal at the output of the reference radio broadcast receiver device 443. In operation, the AI module 452 can detect a suspicious behavior of the radio broadcast receiver device under test 100 based on the spectrum of frequencies over time of the demodulated audio signal at the output of the radio broadcast receiver under test 100, and uses the CAN messages and the audio signal from the output of the reference radio broadcast receiver device 443 to detect a false positive detection. The AI module 452 is trained to do that with input training data further including CAN messages and the spectrums of frequencies of audio signals from the output of a reference radio receiver (in addition to the audio samples).

The signal analyzer 451, the neural network 452, the false positive detector 453, the control signal generator 454, and the software defined radio receivers 441a, 441b can be software components stored in one or more memories and running on the processor 480. Thus, the present disclosure also concerns a computer program including instructions to cause the tester and recorder device 400 to execute the steps carried out by the elements of the tester and recorder device 400 (namely steps S6, S7, S8, S10, S11, S12, S20, S21 and S30) of the method that will now be described. The program instructions are stored in a storage module and can be executed by a computer.

Figure 2:
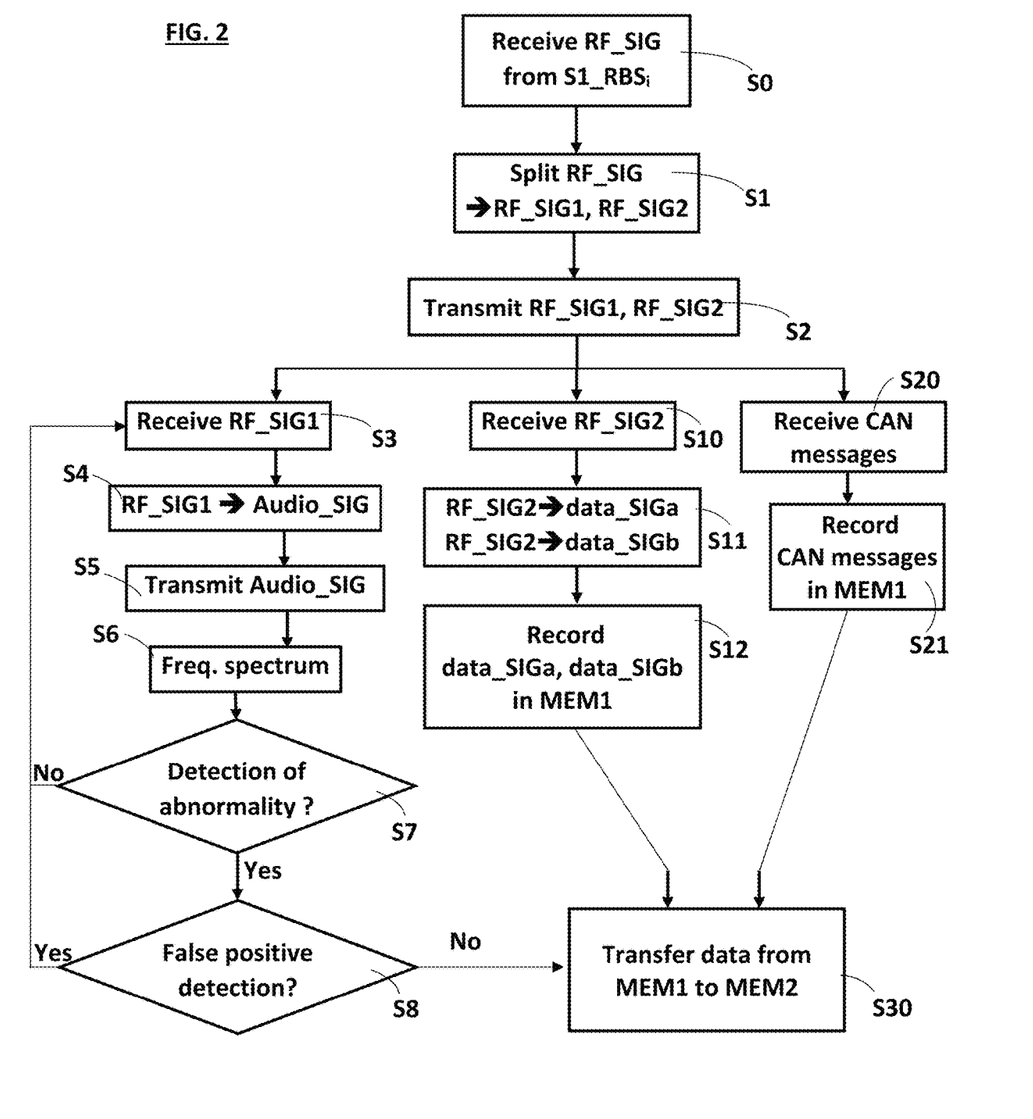
FIG. 2 is a flowchart of a method for testing a radio broadcast receiver device in a vehicle, according to an embodiment.

With reference to FIG. 2, the method for testing the radio broadcast receiver device under test 100 in the vehicle 200 and recording data related to any abnormal behavior of the radio broadcast receiver device under test 100 causing an unwanted sound effect, according to an embodiment, will now be described. It is assumed that the vehicle 200, driven by a driver, is moving and the radio broadcast receiver device 100 is tuned to receive a radio broadcasting source $RBS_i$. As an illustrative and non-limitative example, the radio broadcasting source $RBS_i$ has two radio broadcasting sources: a first source propagating FM radio signals using the first frequency $f_1$ (within the radio spectrum part from 87.5 MHz to 108 MHz) and the first modulation $mod_1$ (FM modulation); a second source propagating DAB radio signals using the second frequency $f_2$ (within the radio spectrum part from 174 MHz to 240 MHz or from 1.452 GHz to 1.492 GHz) and the second modulation mode (for example OFDM).

Any other type of radio broadcasting method may be used in the present disclosure, for example HD radio or any satellite radio (e.g., Sirius XM).

In a first step S0, a radio signal RF_SIG carrying an audio information, is received by the receiver antenna 300, from the radio broadcasting source $RBS_i$. For example, the radio signal RF_SIG has the first frequency $f_1$ within the radio spectrum part from 87.5 MHz to 108 MHz and uses the frequency modulation (FM) $mod_1$.

In a second step S1, the received radio signal RF_SIG is split by the splitter 500 into a first radio signal stream RF_SIG1 and a second radio signal stream RF_SIG2. In a step S2, at the output of the splitter 500, the first radio signal stream RF_SIG1 is transmitted to the radio broadcast receiver device under test 100 and the second radio signal stream is transmitted to the tester and recorder device 400.

In a step S3, the radio broadcast receiver device under test 100 receives the first radio signal stream RF_SIG1 and processes it, in a step S4. In the step S4, the radio broadcast receiver device under test 100 converts the first radio signal stream RF_SIG1 into a demodulated audio signal Audio_SIG. More precisely, it separates the desired radio frequency signal from all the other signals picked up by the antenna 300 using filters, increases the power of the signal for further processing through an amplifier and finally recovers the information carried by the received radio signal RF_SIG1 through demodulation. The radio broadcast receiver device under test 100 outputs an audio demodulated signal (analog signal) Audio_SIG suitable to be fed in input to an electro-acoustic transducer device (like a loudspeaker device).

In a step S5, the audio demodulated signal Audio_SIG at the output of the radio broadcast receiver device under test 100 is transmitted to the first input 410 of the tester and recorder device 400. At the tester and recorder device 400, the control part 450 receives the demodulated audio signal via the first input 410.

In a step S6, the signal analyzer 451 determines a spectrum of frequencies over time of the demodulated audio signal Audio_SIG received via the first input 410. The spectrum of frequencies of the demodulated audio signal Audio_SIG is fed in input to the neural network 452.

In a step S10, in parallel to the step S3, the radio receiver part 440 of the tester and recorder device 400 receives the second radio signal stream RF_SIG2, via the second input 420. Then, in a step S11, each of the radio defined software receivers 441a, 441b processes the received radio signal RF_SIG2 by filtering the desired radio frequency signal, corresponding to its tuned frequency ($f_1$ for the receiver 441a and $f_2$ for the receiver 441b), and by converting the filtered radio signal into a baseband data signal data_SIGa and data_SIGb. Then, each radio defined software receivers 441a, 441b outputs its baseband data signal data_SIGa and data_SIGb that is recorded into the temporary storage memory 460, in a step S12. In an embodiment, the memory 460 is a cyclic buffer. Therefore, as soon as the buffer 460 is full, write in the buffer 460 is performed as follows: when a new data is added in the buffer 460, it overwrites the oldest data.

In a step S20, parallel to the steps S3 and S10, the message acquirer and interpreter 455 receives the CAN messages from the vehicle 200. In a step S21, the CAN messages received are recorded in the temporary storage memory 460.

In a step S7, the neural network 452 performs a detection of audio abnormality in the demodulated audio signal Audio_SIG, corresponding to an abnormal behavior of the radio broadcast receiver under test 100. When an abnormal behavior of the device under test 100 causing an unwanted sound effect is detected, a true flag is generated at the output of the neural network 452. The true flag is generated only in the time when the audio abnormality is detected. When no abnormal audio behavior is detected, the neural network 452 outputs a false flag.

In an embodiment, the spectrum of frequencies over time of the reference audio demodulated signal at the output of the reference radio broadcast receiver device 443 can also be analyzed by the AI module 452. There are four possible scenarios: (i) when the audio signal from the device under test 100 and the audio signal from the reference device 443 are both clear (no abnormality detected by the neural network 452), no true flag is generated at the output of the neural network 452; (ii) when the audio signal from the device under test 100 generates a positive detection of an audio abnormality but not the audio signal from the reference device 443, a true flag is generated at the output of the neural network 452; (iii) when the audio signal from the device under test 100 is clear (no detection of audio abnormality) and the audio signal from the reference device 443 generates a positive detection of an audio abnormality, no true flag is generated at the output of the neural network 452; and (iv) when both the audio signal from the device under test 100 and the audio signal from the reference device 443 generate a positive detection of an audio abnormality, a true flag is generated at the output of the neural network 452 (such a double positive detection is probably because the radio signal strength is poor, but this case is worth being recorded and manually verified).

In case that the neural network 452 outputs a true flag, the false positive detector 453 performs a false positive detection, in a step S8. For that purpose, the detector 453 receives an additional information related to the received radio signal RF_SIG, obtained from a source external to the broadcast radio receiver device under test 100, and verifies that the positive detection (true flag) from the neural network 452 is not a false positive detection based on said additional information. In an embodiment, the additional information includes CAN messages received from the vehicle via the third input 430.

The detector 453 receives CAN messages that contain information related user commands entered by a user with a human-to-machine interface of the vehicle, such as a command for increasing the audio volume on the loudspeaker output or a command for switching the audio source, for example to switch from the current radio broadcast source $RBS_i$ to another radio broadcast source $RBS_j$. In case that the neural network 452 outputs a positive detection of an audio abnormality, the detector 453 verifies if the positive detection is a false positive detection based on the obtained CAN messages. For example, if the information about a volume increase or a switch of the radio broadcast source is provided by the CAN messages, the detector 453 determines that the positive detection (true flag) from the neural network 452 is a false positive detection, because the sound effect detected by the neural network corresponds to a normal behavior of the device under test 100. Typically, if CAN data indicates that the user changed something that will impact audio levels, the flag from the AI module 452 may be ignored. Behavior in such cases may be configurable by a user.

When the CAN messages do not provide any information about a command or a signal from the in-vehicle HMI that may have caused a sound effect likely to be assimilated to an audio distortion but actually normal, the detector 453 determines that the positive detection of audio abnormality (true flag) from the neural network 452 is not a false positive detection.

In case that no false positive detection is detected at the step S8, the generator 454 generates a control signal for transferring data from the first temporary storage memory 460 to the second permanent storage memory 470.

As previously indicated, the false-positive detection may be made by the neural network 452 directly.

In a step S30, data is transferred from the first temporary storage memory 460 to the second permanent storage memory 470.

The transferred data corresponds to a time window including the detected audio abnormality. It covers at least N seconds before and after the detected audio abnormality (that generally lasts a very short period of time). For example, N can be 15, or 20 seconds or more. The transferred data includes: data of the baseband data signal data_SIGa from the first radio designed software receiver 441a;

data of the baseband data signal data_SIGb from the second radio designed software receiver 441*b*; and/or CAN messages from the vehicle 200 and received via the third input 430.

Optionally, the transferred data can further include: data corresponding to a flush of the buffer 460 into the permanent storage memory 470 to save the whole baseband data signal; and/or values of internal data from the vehicle (RMS value, radio signal strength, GPS location, etc.) current state of FSM (Finish State Machine) of the device under test 100.

The present method can be used on a test bench, in laboratory conditions, two or more radio broadcasting sources operating on the bench.

The data recorded in the permanent storage memory 470 can be used to reproduce the detected events that caused the abnormal behavior of the radio broadcast receiver device under test 100 in laboratory conditions, without need to reuse a vehicle driven by a driver. Testing scenarios can be generated by the scenario generator 700 from the data saved in the permanent storage memory 470. The generated testing scenarios are for example stored in a scenario database 701 for a later use in another testing operation. The testing scenarios can be used in an operation of regression testing of the radio broadcast receiver device under test 100 or in an operation of testing another radio broadcast receiver device.

The present disclosure provides many advantages: the use of the tester and recorder device 400 enables the construction of a RWUP (Real World User Profile) database (catalog of recordings of many situations where issues with a radio receiver occurred), which can be successfully used as a basic source for regression tests; the vehicle rides do not have to be performed by experienced engineers because the tester and recorder device 400 collects automatically and only the relevant fragments of the test drive and stores metadata (like classes for failures, speed of vehicle, GPS data, etc.) enabling initial data filtration; and each detected anomaly can be reproduced later, at any time, and used for both regression tests and new tests; it allows to reduce the time spent in testing and the drive costs.

What is claimed is:

1. A method comprising:
   receiving, by a receiver antenna, a radio signal carrying an audio information from a radio broadcasting source;
   splitting, by a splitter, the received radio signal into a first radio signal stream and a second radio signal stream;
   transmitting, by the splitter, the first radio signal stream to a radio broadcast receiver device under test;
   transmitting, by the splitter, the second radio signal stream to a tester and recorder device;
   at the radio broadcast receiver device under test:
      converting the first radio signal stream into a demodulated audio signal; and
      transmitting the demodulated audio signal to the tester and recorder device; and
   at the tester and recorder device:
      receiving via a first input the demodulated audio signal;
      determining a spectrum of frequencies over time of said demodulated audio signal;
      inputting the determined spectrum of frequencies into an artificial intelligence (AI) module of audio abnormality detection;
      receiving via a second input the second radio signal stream;
      converting the second radio signal stream into a data signal;
      recording the data signal into a temporary storage memory; and
      when the AI module outputs a positive detection of audio abnormality, controlling a transfer of data from the temporary storage memory into a permanent storage memory, the transferred data corresponding to a time window including the detected audio abnormality.

2. The method according to claim 1, wherein the tester and recorder device is located in a vehicle, the method further comprising:
   obtaining, by the tester and recorder device, messages from an on-board communication network of the vehicle; and
   determining, by the tester and recorder device, that the positive detection of audio abnormality is a false positive detection based on the obtained messages.

3. The method according to claim 2, wherein:
   the messages from the on-board communication network of the vehicle are recorded in the temporary storage memory; and
   in case of detection of an audio abnormality, which is not a false positive detection, the messages corresponding to the time window including the detected audio abnormality are transferred from the temporary storage memory to the permanent storage memory.

4. The method according to claim 1, further comprising:
   inputting the second radio signal stream into a reference broadcast radio receiver configured to convert the second radio signal stream into a reference demodulated audio signal,
   determining from the reference demodulated audio signal a spectrum of frequencies over time; and
   inputting the spectrum of frequencies of the reference demodulated audio signal into the AI module.

5. The method according to claim 1, further comprising converting, by the tester and recorder device, the second radio signal stream into a baseband data signal that is recorded into the temporary storage memory.

6. The method according to claim 1, further comprising:
   applying the second radio signal stream to a first software defined radio receiver and to a second software defined radio receiver; wherein:
      the first software defined radio receiver is tuned to receive the radio broadcasting source using a first frequency and a first modulation; and
      the second software defined radio receiver is tuned to receive the radio broadcasting source using at least one of a second frequency, different from the first frequency, and a second modulation, different from the first modulation.

7. The method according to claim 6, wherein, when the second radio signal stream is applied to the first software defined radio receiver and to the second software defined radio receiver:
   the first software defined radio receiver outputs a first baseband data signal;
   the second software defined radio receiver outputs a second baseband data signal;
   the first baseband data signal and the second baseband data signal are recorded in the temporary storage memory; and
   the transferring data includes transferring the first baseband data signal and the second baseband data signal from the temporary storage memory into the permanent storage memory.

8. The method according to claim 1, further comprising:
   generating testing scenarios from the data stored in the permanent storage memory; and storing the testing scenarios in a database for a later use in another testing operation.

9. The method according to claim 8, further comprising:
using the testing scenarios in at least one of an operation of regression testing of the radio broadcast receiver device under test or in an operation of testing another radio broadcast receiver device.

10. A tester and recorder device comprising:
a first input for receiving a demodulated audio signal from a radio broadcast receiver device in a vehicle and under test, the demodulated audio signal corresponding to a first radio signal stream split from a radio signal received from a radio broadcasting source by a receiver antenna in the vehicle;
a second input for receiving a second radio signal stream split from the radio signal received by the receiver antenna in the vehicle;
a temporary storage memory;
a permanent storage memory;
a control part connected to the first input and configured to:
  receive the demodulated audio signal via the first input;
  determine a spectrum of frequencies over time and the demodulated audio signal; and
  input the determined spectrum of frequencies into an artificial intelligence (AI) module of audio abnormality detection; and
a radio receiver part connected to the second input and configured to:
  receive the second radio signal stream via the second input;
  convert the second radio signal stream into a data signal;
  record the data signal into the temporary storage memory; and
  responsive to a positive detection of audio abnormality that is output by the AI module, control a transfer of data from the temporary storage memory into the permanent storage memory, the transferred data corresponding to a time window including the detected audio abnormality.

11. The tester and recorder device according to claim 10, wherein the control part further comprises:
a false-positive detector configured to:
  receive messages from an on-board communication network of the vehicle; and
  determine that the positive detection of the audio abnormality is a false positive detection based on the obtained messages,
wherein the control part is further configured to control the transfer of data from the temporary storage memory into the permanent storage memory by enabling the transfer only in case of a non-false positive detection of an audio abnormality.

12. The tester and recorder device according to claim 10, wherein the radio receiver part is configured to convert the second radio signal stream into a baseband data signal before recording into the temporary storage memory.

13. The tester and recorder device according to claim 12, wherein the radio receiver part further comprises:
a first software defined radio receiver tuned to receive signals from the radio broadcasting source using a first frequency and a first modulation; and
a second software defined radio receiver tuned to receive signals from the radio broadcasting source using at least one of a second frequency, different from the first frequency, and a second modulation, different from the first modulation, wherein the second radio signal stream is applied to the first software defined radio receiver and to the second software defined radio receiver.

14. A system comprising:
a receiver antenna in a vehicle, the receive antenna configured to receive a radio signal carrying audio information from a radio broadcasting source;
a splitter configured to split the radio signal received by the receiver antenna into a first radio signal stream and a second radio signal stream;
a radio broadcast receiver device under test configured to convert the first radio signal stream into a demodulated audio signal; and
a tester and recorder device configured to:
  receive the demodulated audio signal from the radio broadcast receiver device under test via a first input;
  determine a spectrum of frequencies over time of the demodulated audio signal;
  input the determined spectrum of frequencies into an artificial intelligence (AI) module of audio abnormality detection;
  receive the second radio signal stream from the splitter via a second input;
  convert the second radio signal stream into a data signal;
  record the data signal into a temporary storage memory; and
  responsive to an output of a positive detection of audio abnormality by the AI module, control a transfer of data from the temporary storage memory into a permanent storage memory, the transferred data corresponding to a time window including the detected audio abnormality.

15. The system of claim 14, wherein the tester and recorder device further comprises:
a false-positive detector configured to:
  receive messages from an on-board communication network of the vehicle; and
  determine that the positive detection of the audio abnormality is a false positive detection based on the obtained messages; and
a control part configured to control the transfer of data from the temporary storage memory into the permanent storage memory by enabling the transfer only in case of a non-false positive detection of an audio abnormality.

16. The system of claim 14, wherein the tester and recorder device is configured to convert the second radio signal stream into a baseband data signal before recording into the temporary storage memory.

17. The system of claim 14, wherein the tester and recorder device further comprises:
a first software defined radio receiver tuned to receive signals from the radio broadcasting source using a first frequency and a first modulation; and
a second software defined radio receiver tuned to receive signals from the radio broadcasting source using at least one of a second frequency, different from the first frequency, and a second modulation, different from the first modulation, wherein the second radio signal stream is applied to the first software defined radio receiver and to the second software defined radio receiver.

18. The system of claim 17, wherein, in response to the second radio signal stream being applied to the first software defined radio receiver and to the second software radio receiver:

the first software defined radio receiver outputs a first baseband data signal;

the second software defined radio receiver outputs a second baseband data signal;

the first baseband data signal and the second baseband data signal are recorded in the temporary storage memory; and the control part controls the transfer of data by controlling the transfer of the first baseband data signal and the second baseband data signal from the temporary storage memory into the permanent storage memory.

19. The system of claim 14, wherein the tester and recorder device further comprises a reference broadcast radio receiver configured to:

convert the second radio signal stream into a reference demodulated audio signal;

determine from the demodulated audio signal an additional spectrum of frequencies over time; and input the additional spectrum of frequencies of the reference demodulated audio signal into the AI module.

20. The system of claim 14, further comprising a testing and recording system configured to:

generate testing scenarios from the data stored in the permanent storage memory;

store the testing scenarios in a database for a later use in another testing operation; and use the testing scenarios in an operation of regression testing of the radio broadcast receiver device under test or in an operation of testing another radio broadcast receiver device.

* * * * *